US011362863B2

(12) United States Patent
Lin et al.

(10) Patent No.: US 11,362,863 B2
(45) Date of Patent: Jun. 14, 2022

(54) HANDLING PACKETS TRAVELLING FROM LOGICAL SERVICE ROUTERS (SRS) FOR ACTIVE-ACTIVE STATEFUL SERVICE INSERTION

(71) Applicant: VMware, Inc., Palo Alto, CA (US)

(72) Inventors: Bo Lin, Beijing (CN); Dong Ping Chen, Beijing (CN); Wei Wang, Beijing (CN); Yi Zeng, Beijing (CN); Xinyu He, Beijing (CN); Dahui Yuan, Beijing (CN); Xiao Liang, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 22 days.

(21) Appl. No.: 17/001,698

(22) Filed: Aug. 25, 2020

(65) Prior Publication Data
US 2022/0029856 A1 Jan. 27, 2022

(30) Foreign Application Priority Data

Jul. 21, 2020 (WO) ................ PCT/CN2020/103170

(51) Int. Cl.
*H04L 12/46* (2006.01)
*H04L 45/586* (2022.01)
*H04L 45/00* (2022.01)
*H04L 45/02* (2022.01)

(52) U.S. Cl.
CPC .......... *H04L 12/4633* (2013.01); *H04L 45/02* (2013.01); *H04L 45/38* (2013.01); *H04L 45/586* (2013.01); *H04L 2212/00* (2013.01)

(58) Field of Classification Search
None
See application file for complete search history.

(56) References Cited

U.S. PATENT DOCUMENTS

| 9,577,845 | B2 | 2/2017 | Thakkar et al. |
| 10,079,779 | B2 | 9/2018 | Zhang et al. |
| 10,225,137 | B2 | 3/2019 | Jain et al. |
| 10,700,960 | B2 | 6/2020 | Bangalore Krishnamurthy |
| 10,938,594 | B1 | 3/2021 | Jain et al. |
| 2016/0142295 | A1 | 5/2016 | Parsa et al. |
| 2017/0317954 | A1* | 11/2017 | Masurekar ............. H04L 45/04 |
| 2018/0006943 | A1* | 1/2018 | Dubey .................. H04L 45/745 |
| 2018/0062914 | A1* | 3/2018 | Boutros ............. H04L 61/2592 |

(Continued)

*Primary Examiner* — Christine T Duong
(74) *Attorney, Agent, or Firm* — Su IP Consulting

(57) ABSTRACT

Example methods and computer systems for packet handling for active-active stateful service insertion are disclosed. One example may involve in response to detecting a first packet from a first active logical service router (SR), a computer system generating and storing state information that associates (a) the first active logical SR and (b) first tuple information specified by the first packet. The first active logical SR and a second active logical SR may be both associated with the service endpoint address and configured to operate in an active-active mode. In response to detecting the second packet from a destination responsive to the first packet, the computer system may select the first active logical SR over the second active logical SR based on the state information and second tuple information specified by the second packet; and send the second packet towards the first active logical SR for processing according to a stateful service.

21 Claims, 10 Drawing Sheets

(56) References Cited

U.S. PATENT DOCUMENTS

| | | |
|---|---|---|
| 2018/0176074 A1 | 6/2018 | Bangalore Krishnamurthy |
| 2018/0205673 A1 | 7/2018 | Jain et al. |
| 2019/0036815 A1 | 1/2019 | Kancherla et al. |
| 2020/0028730 A1* | 1/2020 | Fan .................... H04L 41/0893 |
| 2021/0044516 A1 | 2/2021 | Sellappa et al. |
| 2021/0067378 A1 | 3/2021 | Coimbatore Natarajan et al. |
| 2021/0218600 A1 | 7/2021 | Wang et al. |
| 2021/0218623 A1 | 7/2021 | Jain et al. |
| 2022/0029913 A1 | 1/2022 | Lin et al. |

* cited by examiner

| Flow Type | Session stickiness | Example services |
|---|---|---|
| 1001 Inside full-proxy | YES | DNS, DNS forwarding, inline non-transparent load balancing |
| 1002 Outside full-proxy | YES | Inline non-transparent load balancing |
| 1003 Inside outbound half-proxy | Half-sticky | SNAT |
| 1004 Outside outbound half-proxy | Half-sticky | SNAT |
| 1005 Inside inbound half-proxy | YES | DNAT, inline transparent load balancing |
| 1006 Outside inbound half-proxy | YES | DNAT, inline transparent load balancing |
| 1007 West-east full-proxy | YES | DNAT, inline non-transparent load balancing |
| 1008 West-east outbound half-proxy | Half-sticky | SNAT |
| 1009 West-east inbound half-proxy | YES | DNAT, inline transparent load balancing |

HANDLING PACKETS TRAVELLING FROM LOGICAL SERVICE ROUTERS (SRS) FOR ACTIVE-ACTIVE STATEFUL SERVICE INSERTION

CROSS-REFERENCE TO RELATED APPLICATIONS

The present application claims the benefit of Patent Cooperation Treaty (PCT) Application No. PCT/CN2020/103170, filed Jul. 21, 2020. The present application is also related to U.S. patent application Ser. No. 17/001,696, filed Aug. 25, 2020. The PCT application and the U.S. patent application are herein incorporated by reference in their entirety.

BACKGROUND

Virtualization allows the abstraction and pooling of hardware resources to support virtual machines in a Software-Defined Networking (SDN) environment, such as a Software-Defined Data Center (SDDC). For example, through server virtualization, virtual machines (VMs) running different operating systems may be supported by the same physical machine (e.g., referred to as a "host"). Each VM is generally provisioned with virtual resources to run an operating system and applications. Further, through SDN, benefits similar to server virtualization may be derived for networking services. For example, logical overlay networks may be provisioned, changed, stored, deleted and restored programmatically without having to reconfigure the underlying physical hardware architecture.

In practice, logical routers may be deployed in the SDN environment to provide stateful service(s) to various VMs, such as domain name system (DNS) forwarding, load balancing, network address translation, etc. Conventionally, an active-standby mode is generally implemented using a first logical router operating in an active mode and a second logical router in a standby mode. When there is a failure at the first logical router, the second logical router may switch from the standby mode to the active mode. In some cases, users (e.g., network administrators) may prefer to operate the logical routers in an active-active mode over the active-standby mode to improve performance. However, the active-active mode might be challenging to implement.

BRIEF DESCRIPTION OF DRAWINGS

FIG. 10 is a schematic diagram illustrating example flow types for which active-active stateful service insertion may be performed.

DETAILED DESCRIPTION

Figure 1:
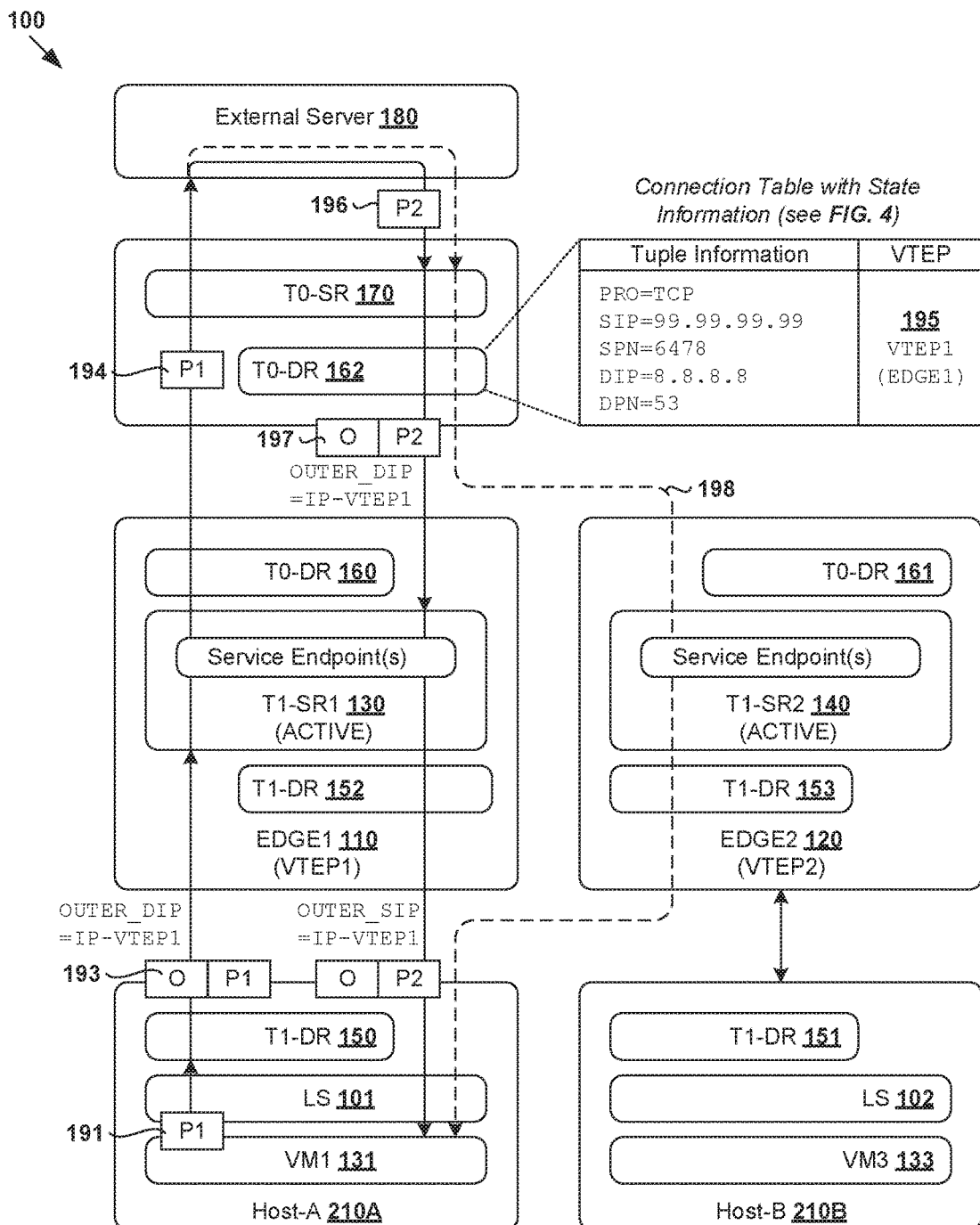
FIG. 1 is a schematic diagram illustrating an example software-defined networking (SDN) environment in which packet handling for active-active stateful service insertion may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 2:
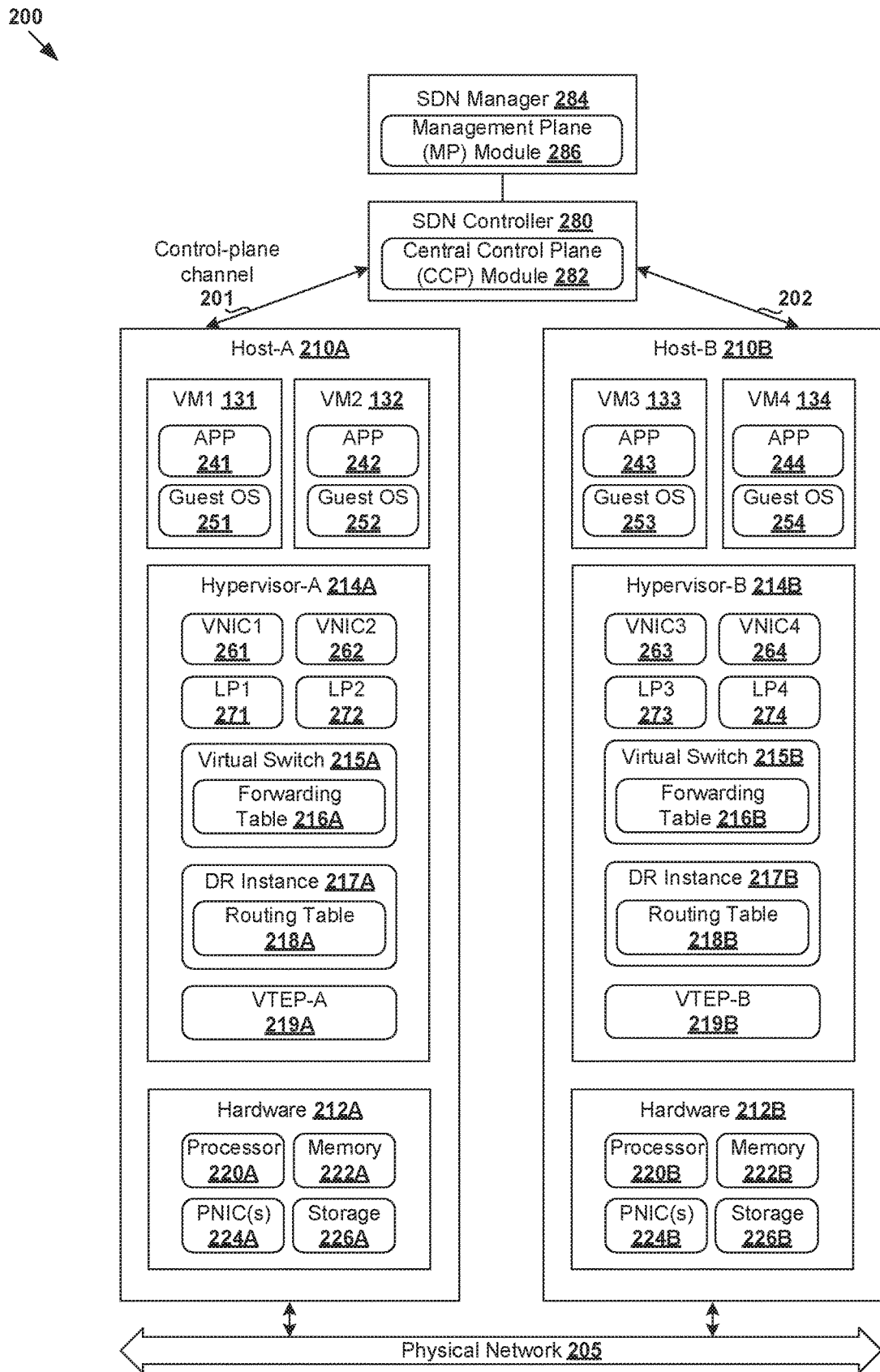
FIG. 2 is a schematic diagram illustrating an example physical view of hosts SDN environment in FIG. 1.

Challenges relating to service insertion will now be explained using FIG. 1 and FIG. 2. In particular, FIG. 1 is a schematic diagram illustrating example software-defined networking (SDN) environment 100 in which packet handling for active-active stateful service insertion may be performed. FIG. 2 is a schematic diagram illustrating example physical view 200 of hosts in SDN environment 100 in FIG. 1. It should be understood that, depending on the desired implementation, SDN environment 100 may include additional and/or alternative components than that shown in FIG. 1 and FIG. 2. In practice, SDN environment 100 may include any number of hosts (also known as "computer systems," "computing devices", "host computers", "host devices", "physical servers", "server systems", "transport nodes," etc.). Each host may be supporting any number of virtual machines (e.g., tens or hundreds).

In the example in FIG. 1, SDN environment 100 may include multiple transport nodes, such as hosts 210A-B that are connected with both EDGE1 110 and EDGE2 120. Referring also to FIG. 2, each host 210A/210B may include suitable hardware 212A/212B and virtualization software (e.g., hypervisor-A 214A, hypervisor-B 214B) to support virtual machines (VMs). For example, host-A 210A may support VM1 131 and VM2 132, while VM3 133 and VM4 134 are supported by host-B 210B. Hardware 212A/212B includes suitable physical components, such as central processing unit(s) (CPU(s)) or processor(s) 220A/220B; memory 222A/222B; physical network interface controllers (PNICs) 224A/224B; and storage disk(s) 226A/226B, etc.

Hypervisor 214A/214B maintains a mapping between underlying hardware 212A/212B and virtual resources allocated to respective VMs. Virtual resources are allocated to respective VMs 131-134 to support a guest operating system (OS; not shown for simplicity) and application(s); see 241-244, 251-254. For example, the virtual resources may include virtual CPU, guest physical memory, virtual disk, virtual network interface controller (VNIC), etc. Hardware resources may be emulated using virtual machine monitors (VMMs). For example in FIG. 2, VNICs 261-264 are virtual network adapters for VMs 131-134, respectively, and are emulated by corresponding VMMs (not shown) instantiated by their respective hypervisor at respective host-A 210A and host-B 210B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 214A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

SDN controller 280 and SDN manager 284 are example network management entities in SDN environment 100. One example of an SDN controller is the NSX controller component of VMware NSX® (available from VMware, Inc.) that operates on a central control plane. SDN controller 280 may be a member of a controller cluster (not shown for simplicity) that is configurable using management plane module 286 on SDN manager 284. Network management entity 280/284 may be implemented using physical machine(s), VM(s), or both. To send or receive control information, a local control plane (LCP) agent (not shown) on host 210A/210B may interact with central control plane (CCP) module 282 at SDN controller 280 via control-plane channel 201/202.

Through virtualization of networking services in SDN environment 100, logical networks (also referred to as overlay networks or logical overlay networks) may be provisioned, changed, stored, deleted and restored programmatically without having to reconfigure the underlying physical hardware architecture. Hypervisor 214A/214B implements virtual switch 215A/215B and logical distributed router (DR) instance 217A/217B to handle egress packets from, and ingress packets to, corresponding VMs. In SDN environment 100, logical switches and logical DRs may be implemented in a distributed manner and can span multiple hosts.

For example, logical switch (LS) 101/102 in FIG. 1 may be deployed to provide logical layer-2 connectivity (i.e., an overlay network) to VM 131/133. Logical switch 101/102 may be implemented collectively by virtual switches 215A-B and represented internally using forwarding tables 216A-B at respective virtual switches 215A-B. Forwarding tables 216A-B may each include entries that collectively implement the respective logical switches. Further, logical DRs that provide logical layer-3 connectivity may be implemented collectively by DR instances 217A-B and represented internally using routing tables 218A-B at respective DR instances 217A-B. Routing tables 218A-B may each include entries that collectively implement the respective logical DRs (to be discussed further below).

Packets may be received from, or sent to, each VM via an associated logical port. For example, logical switch ports 265-268 (labelled "LSP1" to "LSP4" in FIG. 2) are associated with respective VMs 131-134. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 215A-B in FIG. 2, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

A logical overlay network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. Hosts 210A-B may also maintain data-plane connectivity with each other via physical network 205 to facilitate communication among VMs 131-134. Hypervisor 214A/214B may implement virtual tunnel endpoint (VTEP) 219A/219B to encapsulate and decapsulate packets with an outer header (also known as a tunnel header) identifying the relevant logical overlay network (e.g., VNI). For example in FIG. 1, hypervisor-A 214A implements first VTEP-A 219A associated with (IP address=IP-A, VTEP label=VTEP-A). Hypervisor-B 214B implements second VTEP-B 219B with (IP-B, VTEP-B). Encapsulated packets may be sent via an end-to-end, bi-directional communication path (known as a tunnel) between a pair of VTEPs over physical network 105.

Multi-Tier Topology

Referring to FIG. 1 again, a multi-tier logical network topology may be implemented in SDN environment 100 to provide isolation for multiple tenants. The multi-tiered topology enables both provider (e.g., data center owner) and multiple tenants (e.g., data center tenants) to control their own services and policies. For example, a two-tier topology may include (1) an upper tier-0 (T0) associated with a provider and (2) a lower tier-1 (T1) associated with a tenant. In this case, a logical DR may be categorized as T1-DR (see 150-152) or T0-DR (see 160-162). Similarly, a logical SR may be categorized as T1-SR (see 130, 140) or T0-SR (see 170).

On the lower tier, a T1 logical router (DR or SR) connects VM 131/133 implemented by host 210A/210B to a T0 logical router. On the upper tier, a T0 logical router (DR or SR) connects a T1 logical router to an external server (see 180). In practice, a T0-DR (see 160-162) that is connected to T0-SR 170 via a router link switch (not shown) is also known as a router link DR. A T1-DR (see 150-152) that is connected to a T1-SR (see 130-140) via a backplane switch (not shown) is known as a backplane DR.

As used herein, the term "logical DR" may refer generally to a distributed routing component spanning, and implemented collectively by, multiple transport nodes. The term "logical SR" may refer generally to a centralized routing component that provides centralized stateful services, such as domain name system (DNS) forwarding, load balancing, IP address assignment using dynamic host configuration protocol (DHCP), source network address translation (SNAT), destination NAT (DNAT), deep packet inspection, etc. EDGE 110/120 may be implemented using VM(s) and/or a physical machine (i.e., "bare metal machine"), and capable of performing functionalities of a switch, router, bridge, gateway, edge appliance, or any combination thereof.

In practice, a pair of peer service instances may be deployed in SDN environment 100 to provide stateful service(s) to various endpoints, including VM1 131 on host-A 210A and VM3 133 on host-B 210B. For example, T1-SR1 130 is a first logical SR supported by EDGE1 110 and T1-SR2 140 is a second logical SR supported by EDGE2 120. Conventionally, an active-standby mode is generally implemented where T1-SR1 130, for example, operates in an active mode while T1-SR2 140 operates in a standby mode. In this case, north-south traffic between VM1 131 and external server 180 may be forwarded via active T1-SR1 130 for stateful service insertion. Further, east-west traffic between VM1 131 and VM3 133 may also be forwarded via active T1-SR1 130. When there is a failure at T1-SR1 130, a failover may be performed to switch T1-SR2 140 on EDGE2 120 from standby to active mode, thereby improving resilience towards failure.

Unlike the active-standby mode, an active-active mode may involve operating all T1-SR1 130 and T1-SR2 140 in an active mode. Using the active-active mode, traffic may be distributed to one of multiple T1-SRs (e.g., 130-140) to improve throughput performance, resiliency towards failure and scalability. In practice, however, there are various implementation challenges associated with the active-active mode. For example in FIG. 1, host-A 210A may select between first active T1-SR1 130 and second active T1-SR2 140 to send a service request (see "P1") towards external server 180. Similarly, T0 logical routers (e.g., T0-SR 170, T0-DR 162) may select between T1-SR1 130 and T1-SR2 140 to send a related service response (see "P2") towards host-A 210B. If the request is one packet (e.g., request) is processed using one T1-SR1 130 according to a stateful service but a related packet (e.g., response) using another T1-SR2 140, the stateful service might be disrupted or affected.

Active-Active Stateful Service Insertion

According to examples of the present disclosure, packet handling may be improved to facilitate active-active stateful service insertion in SDN environment 100. Throughout the present disclosure, the term "active-active stateful service insertion" may refer generally to a pair of logical routers (e.g., T1-SR1 130 and T1-SR2 140) configured to provide stateful service(s) while operating in an active-active mode. The term "stateful service" may refer generally to a service in which processing of a packet belonging to a flow may depend on the processing of a previous packet in the same flow. Examples of the present disclosure may be implemented to maintain consistency in the selection of T1-SR 130/140 for packets belonging to a particular flow and having related tuple information.

Examples of the present disclosure may be performed by any suitable "computer system" capable of receiving and sending packets to multiple active logical SRs (e.g., T1-SR1 130 and T1-SR2 140) capable of providing stateful service(s). One example computer system is host 210A/210B supporting T1-DR 150/151 to which T1-SR1 130 and T1-SR2 140 are connected. Another example computer system is an EDGE supporting T0-SR 170 and T0-DR 162. Although the terms "first" and "second" are used to describe various elements, these elements should not be limited by these terms. These terms are used to distinguish one element from another. For example, a first element may be referred to as a second element, and vice versa. The term "first active logical SR" (or "second active logical SR") may be used to refer to T1-SR1 130 or T1-SR2 140.

Using examples of the present disclosure, the same active T1-SR1 130 may be selected to process any subsequent packet belonging to the same flow and having the same (or related) tuple information. By maintaining affinity with a particular T1-SR 130/140, session stickiness (also known as session persistence or session consistency) may be implemented for stateful services at EDGE 110/120. For example, when using a sticky session, T1-SRs 130-140 do not have to exchange session information, which is usually a costly process especially when there is a high traffic volume. This should be contrasted against conventional approaches that lack consistency (see 198 in FIG. 1) and possibly disrupt stateful service insertion by T1-SR 130/140, such as by selecting T1-SR1 130 for one packet but different T1-SR2 140 for another packet associated with the same flow or session.

In the following, FIG. 3 will be used to explain handling of packets that are inbound towards. FIG. 4 will be used to explain handling of packets that are outbound from T1-SR 130/140. Note that the term "inbound" refers generally to a direction of a packet travelling towards T1-SR 130/140, the packet being an incoming or ingress packet from the perspective of T1-SR 130/140. The term "outbound" refers generally to a direction of a packet travelling away from T1-SR 130/140, the packet being an outgoing or egress packet from the perspective of T1-SR 130/140.

(a) Handling Inbound Packets Towards T1-SR

Figure 3:
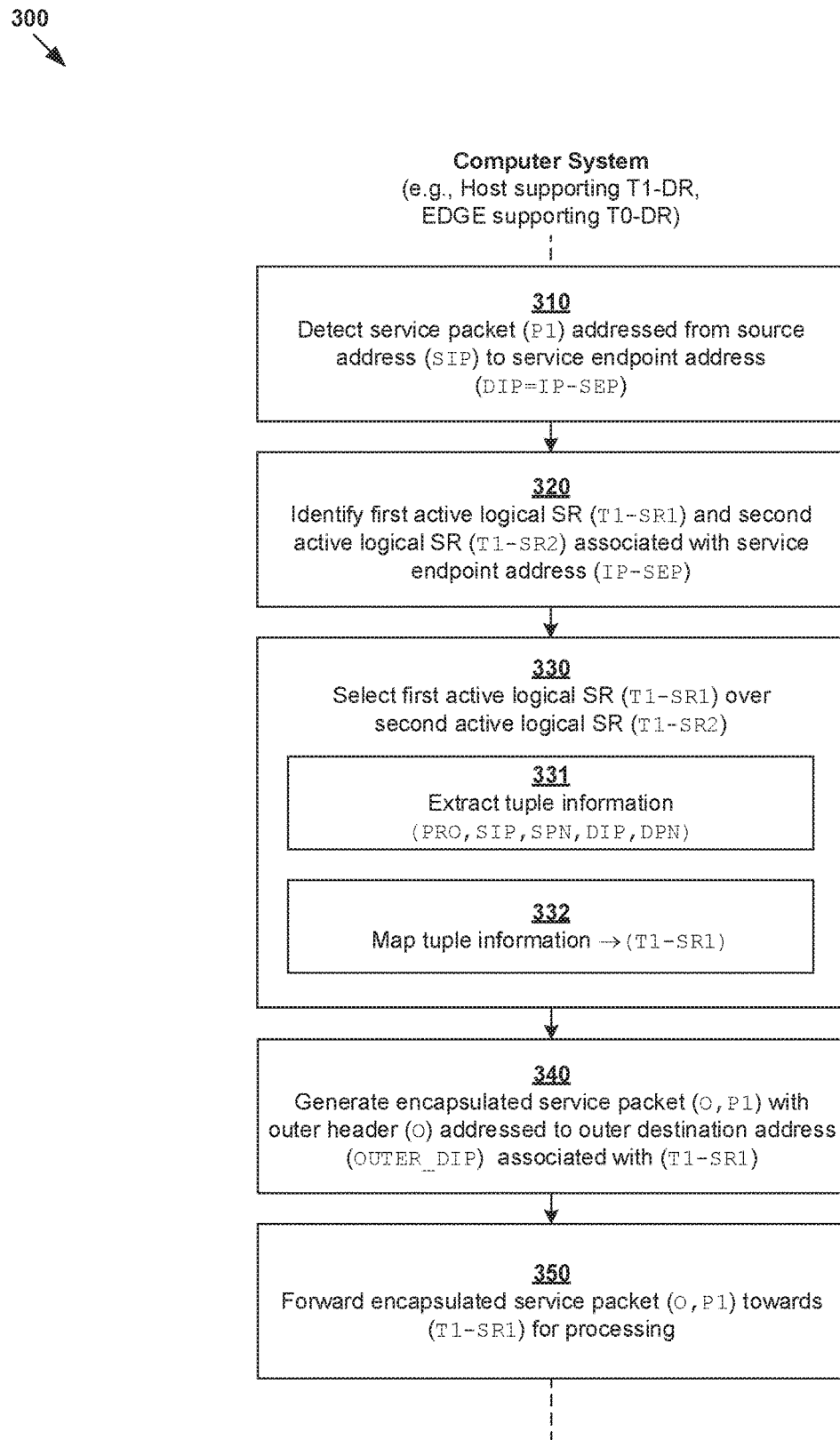
FIG. 3 is a flowchart of a first example process for a computer system to perform packet handling for active-active stateful service insertion.
Figure 4:
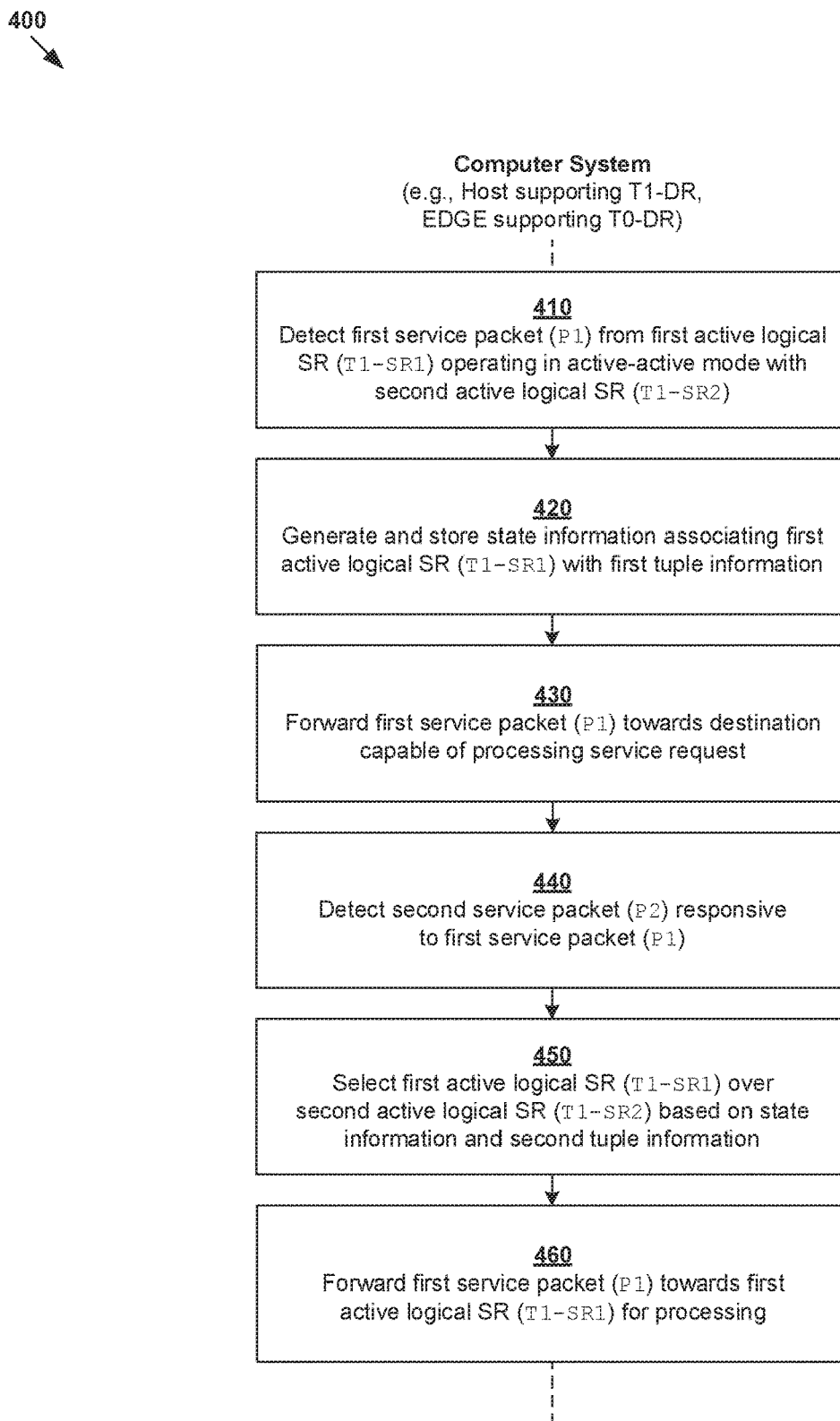
FIG. 4 is a flowchart of a second example process for a computer system to perform packet handling for active-active stateful service insertion.

FIG. 3 is a flowchart of example process 300 for a computer system to perform packet handling for active-active stateful service insertion. Example process 300 may include one or more operations, functions, or actions illustrated by one or more blocks, such as 310 to 350. Depending on the desired implementation, various blocks may be combined into fewer blocks, divided into additional blocks, and/or eliminated. Using the example in FIG. 1, example process 300 will be explained using a computer system in the form of host-A 210A supporting T1-DR 150.

At 310 in FIG. 3, host-A 210A (e.g., T1-DR 150) may detect a packet (see 191 in FIG. 1) that is addressed from a source address (e.g., 192.168.1.1) associated with VM1 131 to a service endpoint address (e.g., 1.1.1.1). In the example in FIG. 1, T1-SR1 130 and T1-SR2 140 both implement a service endpoint (e.g., DNS forwarder) associated with the same service endpoint address (e.g., 1.1.1.1).

At 320 in FIG. 3, based on configuration information (see 192 in FIG. 1) associated with the service endpoint address, host-A 210A may identify T1-SR1 130 and T1-SR2 140 that are configured to operate in an active-active mode. In other words, host-A 210A may forward the packet towards T1-SR1 130 or T1-SR2 140 for processing according to a stateful service.

At 330 in FIG. 3, host-A 210A may select T1-SR1 130 over T1-SR2 140, such as by mapping tuple information specified by the packet to T1-SR1 130. Depending on the desired implementation, the tuple information may include at least the source address (e.g., 192.168.1.1) and the service endpoint address (e.g., 1.1.1.1). Other tuple information may include service protocol (e.g., TCP), source port number, destination port number, etc. The mapping process at block 330 may involve applying a hash function on the tuple information. This way, any subsequent packet specifying the same tuple information may be mapped to the same T1-SR1 130, thereby maintaining T1-SR affinity and session stickiness. This should be contrasted against conventional approaches that lack consistency and session stickiness, such as using a round robin policy to distribute traffic between T1-SR1 130 and T1-SR2 140 for load balancing purposes.

At 340-350 in FIG. 3, host-A 210A may generate and send an encapsulated packet (see 193 in FIG. 1) towards T1-SR1 130 for processing according to a stateful service. The encapsulated packet may be generated by encapsulating the packet with an outer header (O) that is addressed to an outer destination address (e.g., IP-VTEP1) associated with T1-SR1 130 supported by EDGE1 130.

As will be described further using FIGS. 5-10, the configuration information at block 320 may be received from management entity 280/284 and stored in a hash table (also known as a service endpoint inbound flow-consistent hash table) for flow sharding purposes. For example, the configuration information (see 192 in FIG. 1) may associate the service endpoint address with a VTEP group=(VTEP1, VTEP2) supported by respective EDGE1 110 and EDGE2 120. In this case, the encapsulated packet (see 193 in FIG. 1) at blocks 340-350 may be addressed to outer destination address=IP-VTEP1 associated with T1-SR1 130.

(b) Handling Packets from T1-SR

FIG. 4 is a flowchart of example process 400 for a computer system to perform packet handling for active-active stateful service insertion. Example process 400 may include one or more operations, functions, or actions illustrated by one or more blocks, such as 410 to 460. Depending on the desired implementation, various blocks may be combined into fewer blocks, divided into additional blocks, and/or eliminated. Using the example in FIG. 1, example process 400 will be explained using a computer system in the form of an EDGE supporting T0-DR 162.

At 410-430 in FIG. 4, in response to detecting a first packet (see "P1" 194 in FIG. 1) from T1-SR1 130, EDGE supporting T0-DR 162 may generate and store state information (see 195 in FIG. 1) before sending the first packet towards a destination (e.g., external server 180). For example in FIG. 1, state information 195 may associate (a) T1-SR1 130 supported by EDGE1 130 and reachable via VTEP1 with (b) first tuple information specified by the first packet. Any suitable first tuple information may be stored, such as service protocol (e.g., TCP), source IP address (e.g., 99.99.99.99), source port number (e.g., 6487), destination IP address (e.g., 8.8.8.8) and destination port number (e.g., 53).

State information 195 may be stored in a connection table (also known as a service endpoint outbound flow connection table) for session or connection tracking purposes.

At 440-460 in FIG. 4, in response to detecting a second packet (see "P2" 196 in FIG. 1) from destination=external server 180 responsive to the first packet, EDGE supporting T0-DR 162 may select T1-SR1 130 and send the second packet towards T1-SR1 130 for processing according to a stateful service (e.g., DNS forwarding). T1-SR1 130 may be selected over T1-SR2 140 based on the state information at block 420 and second tuple information specified by the second packet, thereby maintaining affinity with T1-SR1 130 and session consistency. Since the second packet is a response to the first packet, first tuple information and second tuple information are "related" in that the source address/port number in the first packet is the destination address/port number in the second packet, and vice versa.

As will be described further using FIGS. 5-10, the state information at block 420 may be generated and stored dynamically based on real-time datapath traffic. Depending on the desired implementation, block 420 may be performed in response to identifying a service flag indicating stateful service connection. The service flag may be set by T1-SR1 130 from which the first packet is received. Block 460 may involve EDGE supporting T0-DR 162 generating an encapsulated packet (see 197 in FIG. 1) by encapsulating the second packet with an outer header that is addressed to outer destination address=IP-VTEP1 associated with T1-SR1 130.

Examples of the present disclosure may be implemented to improve scalability. For example, although explained using T1-SR1 130 and T1-SR2 140 for simplicity and conciseness, it should be understood that more than two T1-SRs may be deployed in SDN environment 100. In general, multiple (M) T1-SRs may be deployed where each active logical T1-SRj is supported by a corresponding edge (EDGEj) using j=1, . . . , M and M>2. In this case, the term "active-active" may refer generally to a scenario where there are M>2 active T1-SRs capable of performing stateful service insertion according to examples of the present disclosure.

Service Endpoint Configuration

According to examples of the present disclosure, a service endpoint associated with the same service endpoint address may be configured on multiple logical T1-SRs. Some examples will be described using FIG. 5, which is a schematic diagram illustrating example service endpoint configuration 500 for active-active stateful service insertion. Various examples will be explained below using the following notations: PRO=service protocol, SIP=source IP address, SPN=source port number, DIP=destination IP address, DPN=destination port number, OUTER_SIP=outer source IP address in an outer header, OUTER_DIP=outer destination IP address, etc.

Figure 5:
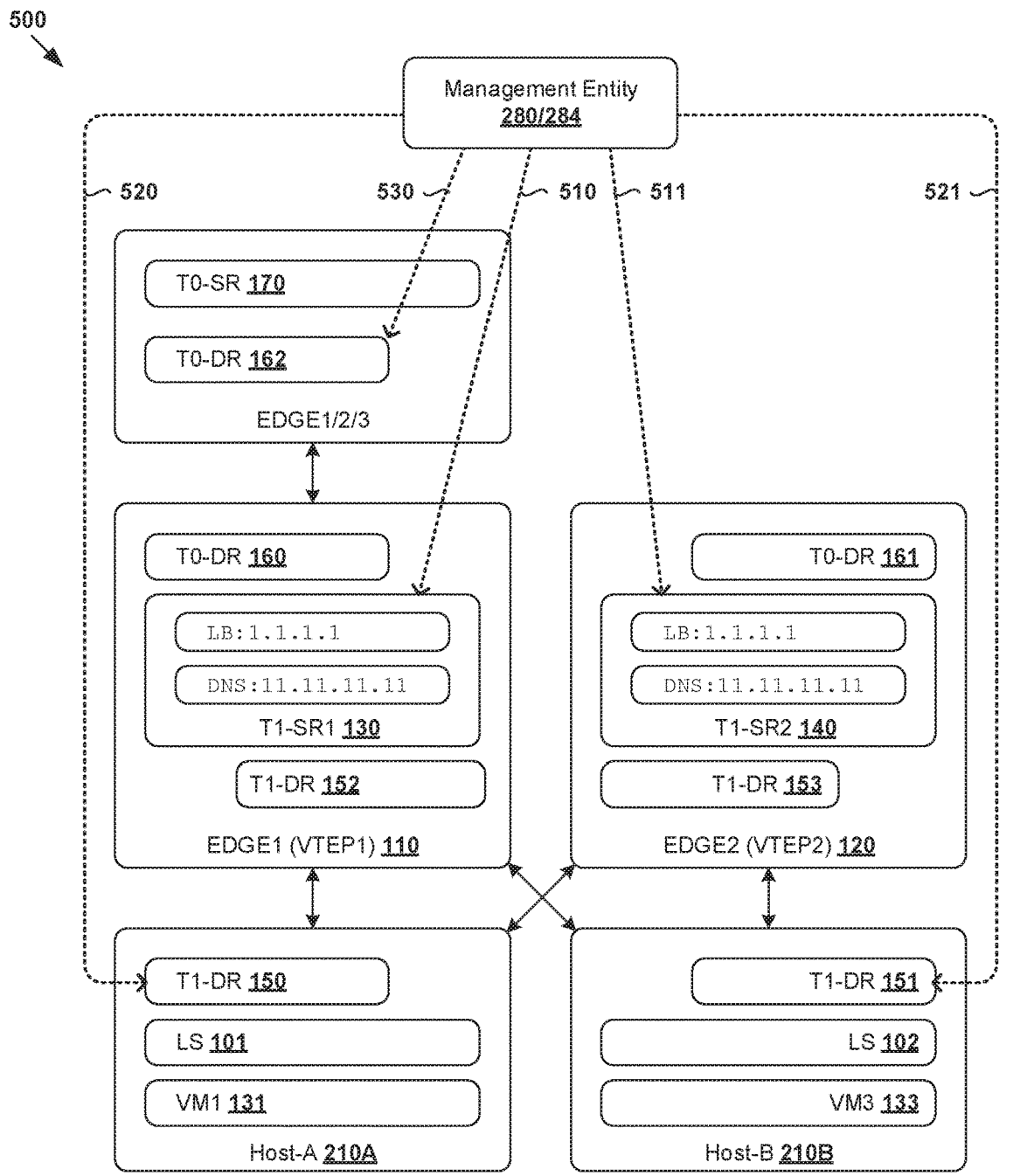
FIG. 5 is a schematic diagram illustrating an example configuration to facilitate active-active stateful service insertion.

At 510-511 in FIG. 5, management entity 180/184 may configure T1-SR1 130 and T1-SR2 140 to implement instances of a service endpoint. In a first example, service endpoint=DNS forwarder (see "DNS" in FIG. 5) may be configured to relay DNS packets between hosts 210A-B and external DNS server 180 (see FIG. 1). From the perspective of hosts 210A-B, the DNS forwarder may use (service endpoint IP address=11.11.11.11, port number=53) as listen address for VMs (e.g., VM1 131). As will be discussed further using FIG. 6, the DNS forwarder may use a different IP address=99.99.99.99 to interact with an upstream DNS server 180 associated with IP address=8.8.8.8 and port number=53. See also corresponding FIG. 7.

In a second example, T1-SR1 130 and T1-SR2 140 may implement service endpoint=load balancer (see "LB" in FIG. 5) to distribute service requests from clients (e.g., VM1 131 or external server) to backend servers (e.g., VM3 133). The load balancer may be associated with service endpoint IP address=1.1.1.1 and port number=80 to communicate with clients and/or backend servers. Any suitable load balancing mode may be implemented, such as non-transparent (see FIG. 8) where the IP address associated with source=client is hidden from the backend server, inline transparent (see FIG. 9) where the source IP address is not hidden, etc. For service management purposes, a service endpoint address may be allocated from a pool of IP addresses.

Once a service is replicated on different T1-SRs 130-140, respective EDGE1 110 and EDGE2 120 may report their VTEP information to management entity 280/284 for aggregation. After aggregation, at 520-521 and 530 in FIG. 5, management entity 280/284 may push configuration information associated with the service to various transport nodes, such as host 210A/210B supporting T1-DR 150/151, EDGE supporting T0-DR 162, etc. The configuration information may specify service endpoint information (e.g., service protocol, service endpoint address, port number) and VTEP information associated with T1-SR1 130 and T1-SR2 140. The configuration information may be stored in any suitable data structure, such as a hash table, etc.

At 540 in FIG. 5, to facilitate stateful DNS forwarding at T1-SRs 130-140, a hash table accessible by T1-DR 150/151 may be updated to include the following configuration information: (PRO=TCP, DIP=11.11.11.11, DPN=53, GRP=(VTEP1, VTEP2)). This way, a packet requiring the stateful DNS forwarding service may be mapped or hashed to either T1-SR1 130 or T1-SR2 140, such as by applying a hash function on tuple information specified by the packet. See 550 in FIG. 5 and FIG. 7.

At 541 in FIG. 5, to facilitate stateful load balancing at T1-SRs 130-140, a hash table accessible by T1-DR 150/151 and T0-DR 162 may be updated to include the following configuration information: (PRO=TCP, DIP=1.1.1.1 and DPN=80, GRP=(VTEP1, VTEP2)). This way, a packet requiring the stateful load balancing service may be mapped or hashed to either T1-SR1 130 or T1-SR2 140, such as by applying a hash function on tuple information specified by the packet. See 560 in FIG. 5 and FIGS. 8-9.

Throughout the present disclosure, T0-SR 170 may be configured to operate in an active-standby mode. Active T0-SR 170 is the default tier-0 logical SR for both T1-SR1 130 and T1-SR2 140. In the event of a failure, a failover may be triggered such that a standby T0-SR (not shown) takes over the active role from T0-SR 170.

Stateful DNS Forwarding Service

Figure 6:
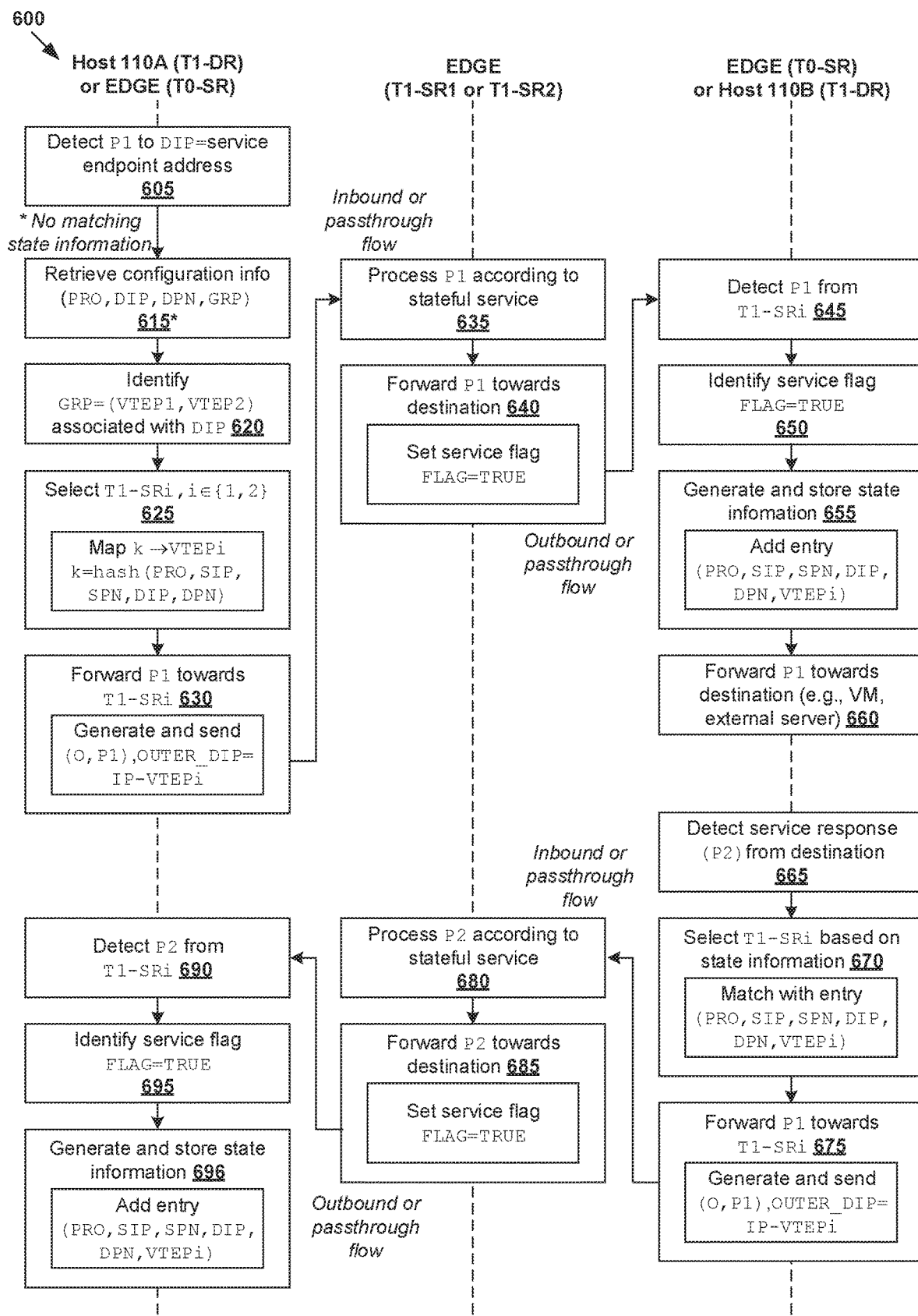
FIG. 6 is a flowchart of an example detailed process for packet handling for active-active stateful service insertion.

FIG. 6 is a flowchart of example detailed process 600 for a computer system to perform packet handling for active-active stateful service insertion in SDN environment 100. Example process 600 may include one or more operations, functions, or actions illustrated by one or more blocks, such as 605 to 696. The various blocks may be combined into fewer blocks, divided into additional blocks, and/or eliminated depending on the desired implementation. The example in FIG. 6 will be explained using FIG. 7, which is a schematic diagram illustrating first example 700 of active-active stateful service insertion in SDN environment 100. In particular, flows 701-704 may be referred to as session-sticky, full-proxy flows from south (i.e., host-A 210A within data center) to north (i.e., outside of data center).

(a) Active T1-SR Selection

Figure 7:
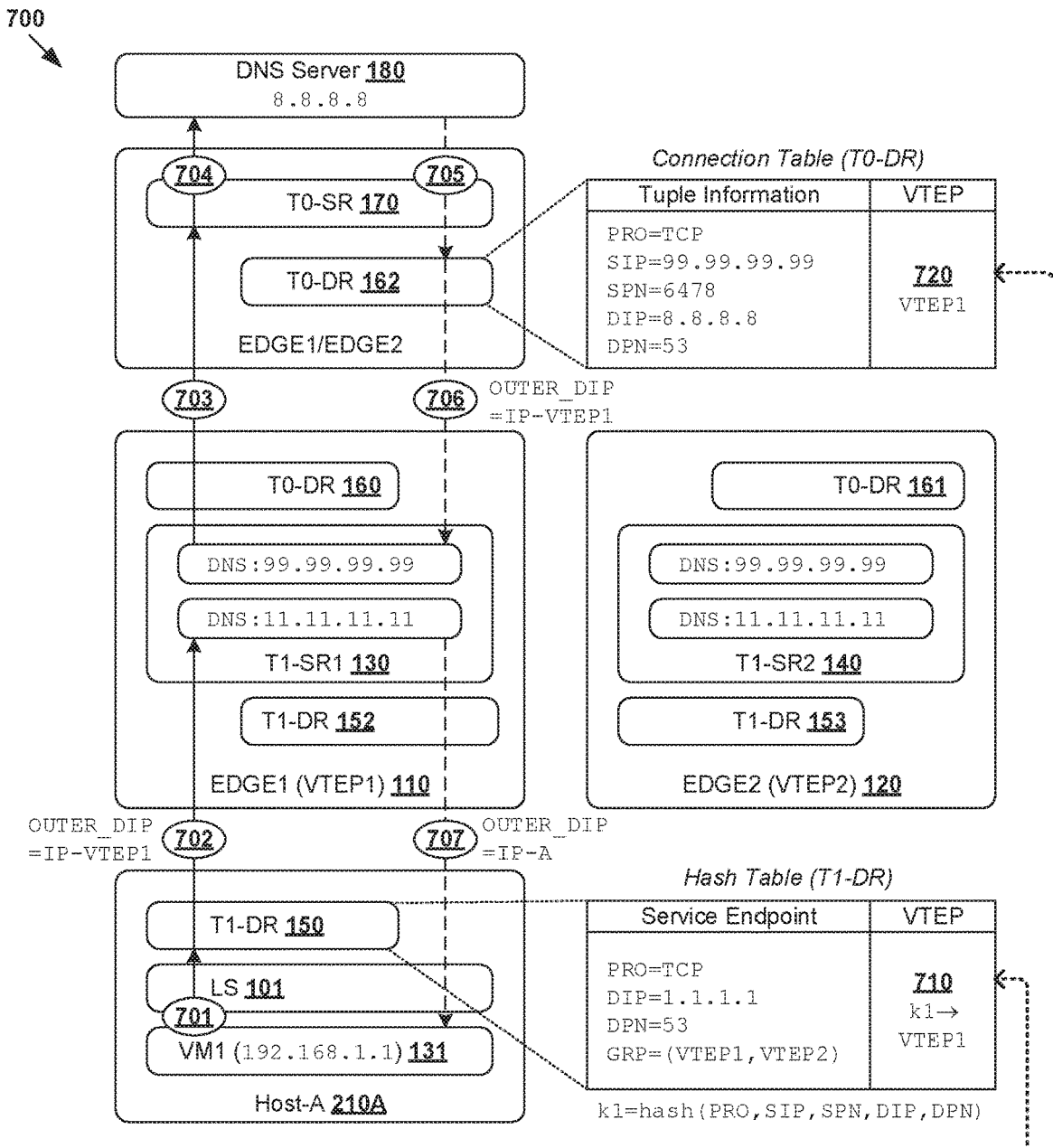
FIG. 7 is a schematic diagram illustrating a first example packet handling for active-active stateful service insertion.

At 701 in FIG. 7, T1-DR 150 may detect a DNS request from VM1 131 via LS 101. The DNS request is generated and sent to resolve a domain name (e.g., www.xyz.com) to an IP address (e.g., IP-xyz). The DNS request may specify (PRO=TCP, SIP=192.168.1.1, SPN=7589, DIP=11.11.11.11, DPN=53). SIP=192.168.1.1 is associated with source=VM1 131, which initiated the DNS request to communicate with a server (not shown) associated with the resolved IP address. DIP=11.11.11.11 is associated with a DNS forwarder implemented by both first active T1-SR1 130 on EDGE1 110 and second active T1-SR2 140 on EDGE2 120. The DNS forwarder is configured to relay DNS packets between hosts 210A-B and DNS server 180 with IP address=8.8.8.8. See also 605 in FIG. 6.

In response to detecting the DNS request, T1-DR 150 may retrieve configuration information 540 in FIG. 5 based on content of the DNS request, such as (PRO=TCP, DIP=11.11.11.11 and DPN=53). Based on the configuration information, T1-DR 150 may identify VTEP group=(VTEP1, VTEP2) associated with service endpoint=DNS forwarder. See also 610 in FIG. 6. Next, T1-DR 150 may perform T1-SR selection, such as by applying a hash function on 5-tuple information to obtain a hash value (k1) as follows:

$k1$=hash(PRO=TCP,SIP=192.168.1.1,SPN=7589, DIP=11.11.11.11,DPN=53).

Hash value (k1) may then be mapped to one member of VTEP group=(VTEP1, VTEP2), such as VTEP1 associated with first active T1-SR1 130 in the example in FIG. 7. As such, first active T1-SR1 130 supported by EDGE1 110 is selected. See also 620-625 in FIGS. 6 and 710 in FIG. 7. Unlike conventional approaches, examples of the present disclosure may be implemented to select the same T1-SR1 130 for subsequent DNS request(s) having the same or related 5-tuple information, thereby maintaining consistency and facilitating stateful service insertion.

At 702 in FIG. 7, T1-DR 150 may generate and send an encapsulated DNS request towards first active T1-SR1 130 on EDGE1 110. The encapsulated DNS request may be generated by encapsulating the DNS request with an outer header specifying (OUTER_SIP=IP-A, OUTER_DIP=IP-VTEP1). Here, outer source VTEP IP address=IP-A is associated with VTEP-A 219A on host-A 210A. The outer destination VTEP IP address=IP-VTEP1 is associated with EDGE1 110 on which first active T1-SR1 130 is implemented. See also 630 in FIG. 6.

At 703 in FIG. 7, EDGE1 110 may perform decapsulation and process the DNS request according to a stateful service. Acting as a DNS forwarder, T1-SR1 130 may update tuple information in the DNS request, such as to (PRO=TCP, SIP=99.99.99.99, SPN=6478, DIP=8.8.8.8, DPN=53). Note that SIP=99.99.99.99 is used to interact with DNS server 180. Further, T1-SR1 130 may associate the DNS request with a service flag indicating stateful service connection. For example, service flag=TRUE may be set in an outer header (e.g., configured according to GENEVE, VXLAN, etc.) of the DNS request before forwarding it towards T0-SR 170. See also 635-640 in FIG. 6.

(b) Stateful Service Connection

At 704 in FIG. 7, in response to the DNS request, T0-DR 160/162 may identify service flag=TRUE, which indicates a stateful service connection. In this case, state information associated with the DNS request may be generated and stored in a connection table accessible by T0-DR 162. The state information may associate (a) tuple information of the DNS request with (b) VTEP information associated with first active T1-SR1 130. See (PRO=TCP, SIP=99.99.99.99, SPN=6478, DIP=8.8.8.8, DPN=53, VTEP1) at 720 in FIG. 7. The DNS request is then forwarded towards DNS server 180 via T0-SR 170. See 645, 650, 655 and 660 in FIG. 6.

It should be noted that any suitable approach may be used to trigger state information generation according to blocks 655-660. For example, if both T1-SR1 130 and T0-SR 170 are supported by the same EDGE1 110, another approach is for EDGE1 110 to generate and store state information 720 in the connection table directly without having to set service flag=TRUE and state information At 705 in FIG. 7, DNS server 180 may respond with a DNS response that resolves a domain name (i.e., query input) in the DNS request into an IP address (i.e., query output). The DNS response may specify (PRO=TCP, SIP=8.8.8.8, SPN=53, DIP=99.99.99.99, DPN=6478) and forwarded towards T0-SR 170.

At 706 in FIG. 7, in response to detecting the DNS response from DNS server 180, T0-DR 162 may retrieve matching state information specifying (PRO=TCP, SIP=99.99.99.99, SPN=6478, DIP=8.8.8.8, DPN=53, VTEP1) from the connection table. Based on associated VTEP information, T0-DR 162 may forward the DNS response towards first active T1-SR1 130 using outer destination IP address=IP-VTEP1, thereby maintaining connection stickiness with T1-SR1 130. This should be contrasted against conventional approach that receives the service request from first active T1-SR1 130 but forwards the service response towards the second active T1-SR2 140 because both are operating in an active-active mode. See 665, 670 and 675 in FIG. 6.

At 707 in FIG. 7, T1-SR1 130 may detect and process the DNS response according to a stateful service. Acting as a DNS forwarder, T1-SR1 130 may update tuple information in the DNS request to specify (PRO=TCP, SIP=11.11.11.11, SPN=53, DIP=192.168.1.1, DPN=7589) based on the DNS request (see 701/702) from VM1 131. In practice, T1-SR1 130 may implement a stateful service by storing information associated with the DNS request to facilitate subsequent processing of the DNS response. By ensuring the DNS response is forwarded to T1-SR1 130 instead of T1-SR2 140 (which does not have any information of the DNS request), DNS forwarding may be performed on the return path.

To reach host-A 210A, EDGE1 110 (e.g., encapsulation handler) may encapsulate the DNS response with an outer header that is addressed from OUTER_SIP=IP-VTEP1 associated with EDGE1 130 and OUTER_DIP=IP-A associated with VTEP-A 219A on host-A 210A. See also 680-685 in FIG. 6. Depending on the desired implementation, T1-SR1 130 may associate the DNS response with a service flag indicating stateful service connection. The service flag may be set to cause T1-DR 150/152 to store state information associated with the DNS response (not shown in FIG. 7 for simplicity). See also 690, 695 and 696 in FIG. 6.

Stateful Non-Transparent Load Balancing

Examples of the present disclosure may be implemented to facilitate stateful service insertion in the form of non-transparent load balancing using T1-SR1 130 and T1-SR2 140 operating in an active-active mode. Some examples will be described using FIG. 8, which is a schematic diagram illustrating second example 800 of active-active stateful service insertion in SDN environment 100. Here, a load balancer may operate in a non-transparent mode where IP address information of a client is hidden from the backend servers, and vice versa. Alternatively, as will be discussed using FIG. 9, a transparent mode (IP address information not hidden) may be used.

(a) Service Configuration

Figure 8:
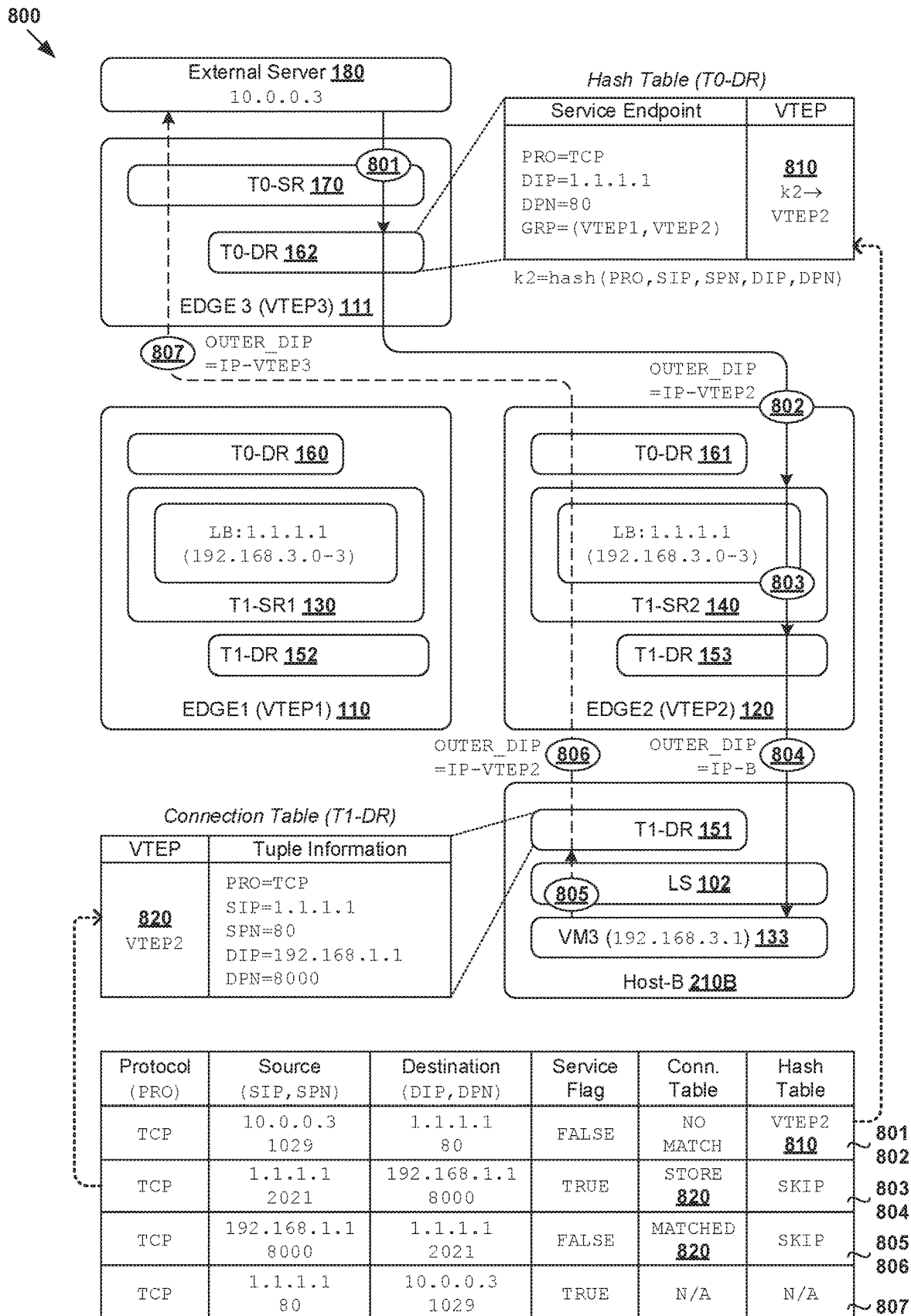
FIG. 8 is a schematic diagram illustrating a second example packet handling for active-active stateful service insertion.

In the example in FIG. 8, service endpoint=load balancer may be replicated on both T1-SR1 130 and T1-SR2 140 according to the configuration process in FIG. 5. The load balancer is associated with IP address=1.1.1.1 and capable of directing service requests to one of multiple backend servers associated with IP address range=192.168.3.0 to 192.168.3.3. One backend server is VM3 133 (having IP address=192.168.3.1) on host-B 210B.

On the upper tier, T0-SR 170 may be supported by EDGE3 111 and capable of forwarding service requests from external server 180 to T1-SR1 130 and T1-SR2 140. To facilitate active-active stateful service insertion, management entity 180/184 may configure T0 logical router=T0-DR 162 to store service configuration information in hash table 810 in FIG. 8. In particular, the service configuration information may associate (a) the load balancer's (PRO=TCP, DIP=1.1.1.1 and DPN=80) with (b) VTEP group=(VTEP1, VTEP2) associated with respective T1-SR1 130 and T1-SR2 140. This way, an ingress load balancing request may be mapped or hashed to one member of the VTEP group.

(b) Active T1-SR Selection

At 801 in FIG. 8, T0 logical routers T0-SR 170 and T0-DR 162 may detect a service request from external server 180. The service request may specify (PRO=TCP, SIP=10.0.0.3, SPN=1029, DIP=1.1.1.1, DPN=80). Source IP address (SIP)=10.0.0.3 is associated with external server 180. Destination IP address (DIP)=1.1.1.1 is associated with a non-transparent load balancer implemented by both T1-SR1 130 and T1-SR2 140. The load balancer is capable of distributing the service request to one of multiple backend servers, one of which being VM3 133 on host-B 210B.

Based on content of the service request, T0-DR 162 may retrieve service configuration information from hash table 810 in FIG. 8, particularly (PRO=TCP, DIP=1.1.1.1 and DPN=53) associated with VTEP group=(VTEP1, VTEP2). Next, T0-DR 162 may then perform active T1-SR selection, such as by applying a hash function on 5-tuple information in the service request as follows:

$$k2=\text{hash}(\text{PRO=TCP,SIP=10.0.0.3,SPN=1029,}$$
$$\text{DIP=1.1.1.1,DPN=80}).$$

Hash value (k2) may then be mapped to one member of VTEP group=(VTEP1, VTEP2), such as VTEP2 associated with second active T1-SR2 140 in the example in FIG. 8. As such, second active T1-SR2 140 supported by EDGE2 120 is selected. Unlike conventional approaches, examples of the present disclosure may be implemented to select the same T1-SR2 140 for any subsequent service request(s) having the same 5-tuple information, thereby maintaining consistency and facilitating stateful service insertion.

At 802 in FIG. 8, T0-DR 162 may generate and send an encapsulated service request towards second active T1-SR2 140 on EDGE2 120. The encapsulated service request may be generated by encapsulating the service request with an outer header specifying (OUTER_SIP=IP-VTEP3, OUTER_DIP=IP-VTEP2). Here, outer source VTEP IP address=IP-VTEP3 is associated with VTEP3 on EDGE3 111. The outer destination VTEP IP address=IP-VTEP2 is associated with EDGE2 120 on which second active T1-SR2 140 is implemented. The outer header may be generated according to any suitable encapsulation protocol, such as GENEVE, VXLAN, etc.

At 803 in FIG. 8, in response to detecting the encapsulated service request, EDGE2 120 may perform decapsulation and process the service request accordingly. Acting as a non-transparent load balancer, T1-SR2 140 may update tuple information in the service request to specify (PRO=TCP, SIP=1.1.1.1, SPN=2021, DIP=192.168.1.1, DPN=8000). Note that SIP=1.1.1.1 is used to hide the IP address of external server 180 from backend server VM3 133. Further, T1-SR2 140 may associate the service request with a service flag indicating stateful service connection. For example, service flag=TRUE may be set in the outer header of the service request before forwarding it towards host-B 210B.

(b) Stateful Service Connection

At 804 in FIG. 8, in response to the service request, host-B 210B may identify service flag=TRUE in the service request. In this case, to facilitate active-active stateful service insertion, state information associated with the service request may be stored in connection table 820 accessible by T0 logical router, such as T1-DR 151. The state information may associate (a) tuple information of the service request with (b) VTEP information associated with second active T1-SR2 140. See (PRO=TCP, SIP=1.1.1.1, SPN=2021, DIP=192.168.3.1, DPN=8000, VTEP3) at 820 in FIG. 8. The service request is then forwarded towards VM3 133 for processing.

At 805 in FIG. 8, VM3 133 may perform any necessary processing and respond with a service response specifying (PRO=TCP, SIP=192.168.3.1, SPN=8000, DIP=1.1.1.1, DPN=2021).

At 806 in FIG. 8, in response to detecting the service response from VM3 133 via LS 102, T1-DR 151 may retrieve matching state information configured above. See 820 in FIG. 8. Based on associated VTEP information, T1-DR 151 may forward the service response towards second active T1-SR2 140 using outer destination IP address=IP-VTEP2, thereby maintaining connection consistency. Again, this should be contrasted against conventional approach that receives the service request from second active T1-SR2 140 but forwards the service response towards first active T1-SR1 130 because both are operating in an active-active mode.

At 807 in FIG. 8, T1-SR2 140 may detect and process the service response accordingly. For example, tuple information in the service request may be specified to specify (PRO=TCP, SIP=1.1.1.1, SPN=80, DIP=10.0.0.3, DPN=1029). To reach EDGE3 111, the service response may be encapsulated with an outer header that is addressed from OUTER_SIP=IP-VTEP2 associated with EDGE2 140 and OUTER_DIP=IP-VTEP3 associated with EDGE3 111. The encapsulated service request is then forwarded towards external server 180 via T0-SR 170.

Stateful Transparent Load Balancing

Examples of the present disclosure may be implemented to facilitate stateful service insertion for west-east (or east-west) traffic using T1-SR1 130 and T1-SR2 140 operating in an active-active mode. Some examples will be described using FIG. 9, which is a schematic diagram illustrating third example 900 of active-active stateful service insertion in SDN environment 100. In the example in FIG. 9, load balancing client=VM1 131 with IP address=192.168.1.1 may be located on a client network. Load balancing server=VM3 133 with IP address=192.168.3.1 may be located on a server network. A load balancer supported by both T1-SR1 130 and T1-SR2 140 may be deployed between the client network and the server network.

(b) Active T1-SR Selection

Figure 9:
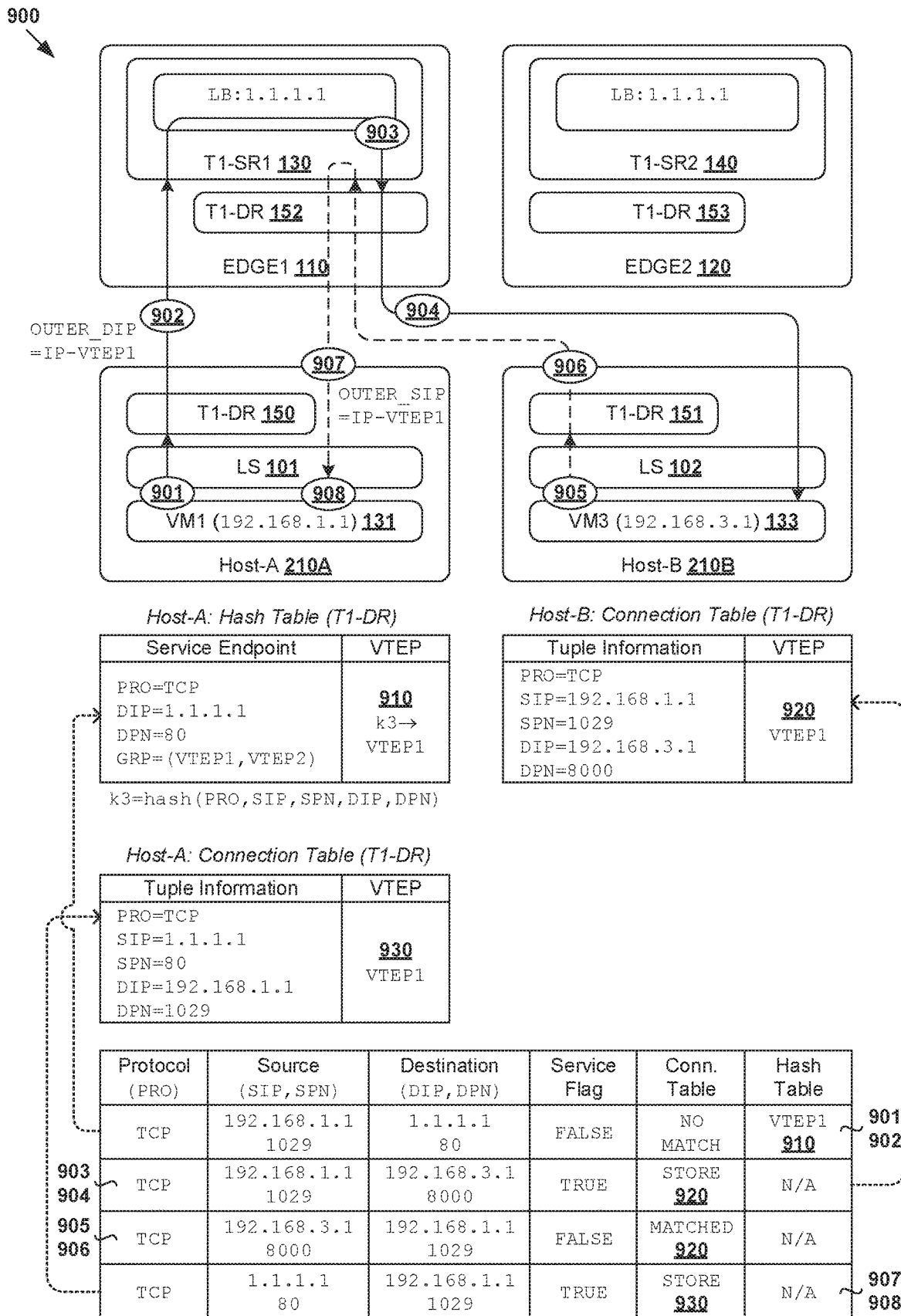
FIG. 9 is a schematic diagram illustrating a third example packet handling for active-active stateful service insertion.

At 901 in FIG. 9, T1-DR 150 may detect a service request from VM1 131. The service request may specify (PRO=TCP, SIP=192.168.1.1, SPN=1029, DIP=1.1.1.1, DPN=80). Source IP address (SIP)=192.168.1.1 is associated with VM1 131. Destination IP address (DIP)=1.1.1.1 is associated with an inline transparent load balancer implemented by both T1-SR1 130 and T1-SR2 140. The load balancer is capable of distributing the service request to one of multiple backend servers, one of which being VM3 133 on host-B 210B.

Based on content of the service request, T1-DR 151 may retrieve service configuration information from hash table 910 in FIG. 9, particularly (PRO=TCP, DIP=1.1.1.1 and DPN=53) associated with VTEP group=(VTEP1, VTEP2). Next, T1-DR 151 may then perform active T1-SR selection, such as by applying a hash function on 5-tuple information in the service request as follows:

$k3$=hash(PRO=TCP,SIP=192.168.1.1,SPN=1029, DIP=1.1.1.1,DPN=80).

Hash value (k3) may then be mapped to one member of VTEP group=(VTEP1, VTEP2), such as VTEP2 associated with first active T1-SR1 130 in FIG. 9. As such, the service request may be mapped to first active T1-SR1 130 supported by EDGE1 110. Note that the same T1-SR1 130 will be selected to handle any subsequent service request(s) having the same 5-tuple information, thereby maintaining consistency and facilitating stateful service insertion.

At 902 in FIG. 9, T1-DR 151 may generate and send an encapsulated service request towards first active T1-SR1 130. The encapsulated service request may be generated by encapsulating the service request with an outer header specifying (OUTER_SIP=IP-A, OUTER_DIP=IP-VTEP1). Here, outer source VTEP IP address=IP-A is associated with VTEP-A 219A on host-A 210A. The outer destination VTEP IP address=IP-VTEP1 is associated with EDGE1 110 on which first active T1-SR1 130 is implemented. The outer header may be generated according to any suitable encapsulation protocol, such as GENEVE, VXLAN, etc.

At 903 in FIG. 9, in response to detecting the encapsulated service request, EDGE1 110 may perform decapsulation and process the service request accordingly. T1-SR1 130 may update destination information in the service request to specify (PRO=TCP, SIP=192.168.1.1, SPN=1029, DIP=192.168.3.1, DPN=80). Acting as an inline transparent load balancer, it is not necessary to hide SIP=192.168.1.1 associated with VM1 131 from VM3 133. Further, T1-SR1 130 may associate the service request with a service flag indicating stateful service connection. For example, service flag=TRUE may be set in the outer header of the service request before forwarding it towards host-B 210B.

(b) Stateful Service Connection

At 904 in FIG. 9, in response to the service request, host-B 210B may identify service flag=TRUE in the service request. In this case, to facilitate active-active stateful service insertion, state information associated with the service request may be stored in connection table 920 accessible by T1-DR 151. The state information may associate (a) tuple information of the service request with (b) VTEP information associated with first active T1-SR1 130. See (PRO=TCP, SIP=192.168.1.1, SPN=1029, DIP=192.168.3.1, DPN=80, VTEP1) at 920 in FIG. 9. The service request is then forwarded towards VM3 133 for processing.

At 905 in FIG. 9, VM3 133 may perform any necessary processing and respond with a service response specifying (PRO=TCP, SIP=192.168.3.1, SPN=8000, DIP=192.168.1.1, DPN=2021).

At 906 in FIG. 9, in response to detecting the service response from VM3 133, T1-DR 151 may retrieve state information (see 920) configured based on the service request. Based on VTEP information=VTEP1, T1-DR 151 may forward the service response towards first active T1-SR1 130 using outer destination IP address=IP-VTEP1, thereby maintaining connection consistency. This should be contrasted against conventional approach that receives the service request from first active T1-SR1 130 but forwards the service response towards second active T2-SR2 140 because both are operating in an active-active mode.

At 907 in FIG. 9, T1-SR1 130 may detect and process the service response accordingly. For example, tuple information in the service request may be updated to specify (PRO=TCP, SIP=1.1.1.1, SPN=80, DIP=192.168.1.1, DPN=1029). To reach host-A 210A, the service response may be encapsulated with an outer header that is addressed from OUTER_SIP=IP-VTEP1 associated with EDGE1 130 and OUTER_DIP=IP-A associated with VTEP-A 219A on host-A 210A. Further, T1-SR1 130 may associate the service response with a service flag indicating stateful service connection, such as by setting service flag=TRUE in the outer header before forwarding the encapsulated service response towards host-B 210B.

At 908 in FIG. 9, in response to the service request, host-A 210A may identify service flag=TRUE in the service request. In this case, to facilitate active-active stateful service insertion, state information associated with the service request may be stored in connection table 930 accessible by T1-DR 150 on host-A 210A. The state information may associate (a) tuple information of the service request with (b) VTEP information associated with first active T1-SR1 130. See (PRO=TCP, SIP=1.1.1.1, SPN=80, DIP=192.168.1.1, DPN=1029, VTEP1) at 930 in FIG. 9.

This way, at 909 in FIG. 9, any subsequent service request with the same tuple information will be mapped to, and forwarded towards, first active T1-SR1 130 reachable via VTEP1. In particular, based on state information 930, service request specifying (PRO=TCP, SIP=192.168.1.1, SPN=1029, DIP=1.1.1.1, DPN=80) may be mapped to VTEP1. In this case, it is not necessary to refer to configuration information 910 in the hash table (i.e., skipped). In practice, connection table lookup may be implemented more efficiently compared to a hash calculation. In this case, a higher lookup priority may be assigned to the connection table storing state information may be assigned with compared to the hash table storing configuration information. See also block 615 with asterisk (*) in FIG. 6.

Flow Type Analysis

It should be understood that examples of the present disclosure may be implemented for various flow types, and not limited to the stateful services discussed using FIGS. 5 to 9. Some example flow types will be described using FIG. 10, which is a schematic diagram illustrating example flow types for which active-active stateful service insertion may be performed. In general, an analysis of the flow types is useful to assess whether session stickiness may be implemented.

(a) Notations

From the perspective of T1-SR 130/140, an "inbound" flow may refer to a flow in which the DIP=service endpoint address (e.g., 11.11.11.11) supported by T1-SR 130/140. An "outbound" flow may refer to a flow in which the SIP=service endpoint address (e.g., 11.11.11.11) supported by T1-SR 130/140. A "pass-through" flow may refer to a flow that travels through T1-SR 130/140 but neither its SIP or DIP is set to the service endpoint address.

The terms "inside" and "outside" may be used to indicate whether a flow is travelling from a south side (e.g., hosts 210A-B) or a north side (e.g., external server 180) of T1-SR 130/140. In particular, an "inside inbound" flow may refer to an inbound flow travelling from a south side of T1-SR 130/140. An "outside inbound" flow may refer to an inbound flow travelling from a north side of T1-SR 130/140. An "inside pass-through" flow may refer to a pass-through flow travelling through T1-SR 130/140 from a south side. An "outside pass-through" flow may refer to a pass-through flow travelling through T1-SR 130/140 from a north side.

A "session-sticky" flow may refer to an inside/outside request flow and corresponding outside/inside response flow that is consistently directed towards the same T1-SR. A "full-proxy" flow may refer generally to a flow that includes (1) an inbound flow and (2) an outbound flow. A "half-proxy" flow may refer generally to a flow that includes (1) an inbound or outbound flow and (2) a passthrough flow. For example, an inside full-proxy flow may be referred to as a session-sticky flow when (1) the request flow is directed to a particular T1-SR and (2) the corresponding response flow is directed towards the same T1-SR.

(b) Flow Types

Referring now to FIG. 10, at 1001, an "inside full-proxy" flow may refer to a flow that travels towards T1-SR 130/140 from a south side and includes (1) an inbound flow (with DIP=service endpoint address) and (2) an outbound flow (with SIP=service endpoint address). Using examples of the present disclosure, sticky sessions may be implemented for inside full-proxy flows to provide active-active stateful services such as DNS forwarding (see FIG. 7) and inline non-transparent load balancing. In this case, an active-standby mode may be used for T0 logical router.

At 1002 in FIG. 10, an "outside full-proxy" flow may refer to a flow that travels towards T1-SR 130/140 from a north side and includes (1) an inbound flow and (2) an outbound flow. Using examples of the present disclosure, sticky sessions may be implemented for outside full-proxy flows to provide active-active stateful services such as non-transparent load balancing (see FIG. 8), etc.

At 1003 in FIG. 10, an "inside outbound half-proxy" flow may refer to a flow travelling towards T1-SR 130/140 from a south side and includes (1) a pass-through flow and (2) an outbound flow. Using examples of the present disclosure, half-sticky sessions may be implemented for inside outbound half-proxy flows to provide active-active stateful services such as SNAT, etc. In this case, there may be limitations, such as using an active-standby mode for T0 logical router, request flow may not ensure the transaction due to the half-sticky session, etc. Here, since the inside outbound half-proxy includes (1) a pass-through flow and (2) an outbound flow, it is possible for a transport node may send out packets via a random T1-SR before state information is configured.

At 1004 in FIG. 10, an "outside outbound half-proxy" flow may refer to a flow travelling towards T1-SR 130/140 from a north side and includes (1) a pass-through flow and (2) an outbound flow. Using examples of the present disclosure, half-sticky sessions may be implemented for outside outbound half-proxy flows to provide active-active stateful services such as SNAT, etc. In this case, the request flow may not ensure the transaction.

At 1005 in FIG. 10, an "inside inbound half-proxy" flow may refer to a flow travelling towards T1-SR 130/140 from a south side and includes (1) an inbound flow and (2) a pass-through flow. Using examples of the present disclosure, sticky sessions may be implemented for inside inbound half-proxy flows to provide active-active stateful services such as DNAT, inline transparent load balancing, etc. An active-standby mode may be used for T0 logical router.

At 1006 in FIG. 10, an "outside inbound half-proxy" flow may refer to a flow travelling towards T1-SR 130/140 from a north side and includes (1) an inbound flow and (2) a pass-through flow. Using examples of the present disclosure, sticky sessions may be implemented for outside inbound half-proxy flows to provide active-active stateful services such as DNAT, inline transparent load balancing, etc.

At 1007 in FIG. 10, a "west-east full-proxy" flow may refer to a flow that travels towards T1-SR 130/140 from a south side and includes (1) an inside inbound flow and (2) an inside outbound flow. Using examples of the present disclosure, sticky sessions may be implemented for west-east full-proxy flows to provide active-active stateful services such as DNAT, inline transparent load balancing, etc.

At 1008 in FIG. 10, an "west-east outbound half-proxy" flow may refer to a flow travelling towards T1-SR 130/140 from a south side and includes (1) an inside pass-through flow and (2) an inside outbound flow. Using examples of the present disclosure, half-sticky sessions may be implemented for west-east outbound half-proxy flows to provide active-active stateful services such as SNAT, etc. In this case, the request flow may not ensure the transaction.

At 1009 in FIG. 10, an "west-east inbound half-proxy" flow may refer to a flow travelling towards T1-SR 130/140 from a south side and includes (1) an inside inbound flow and (2) an inside pass-through flow. Using examples of the present disclosure, sticky sessions may be implemented for west-east inbound half-proxy flows to provide active-active stateful services such as DNAT, inline transparent load balancing, etc.

Container Implementation

Although discussed using VMs 131-134, it should be understood that packet handling for active-active stateful service insertion may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 131, where a different VNIC is configured for each container. Each container is "OS-less", meaning that it does not include any OS that could weigh 11 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. Using the examples in the present disclosure, packet handling for active-active stateful service insertion may be performed to facilitate secure communication among containers located at geographically dispersed sites in SDN environment 100.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 10. For example, a computer system capable of acting as host 210A/210B or EDGE 110/120/111 may be deployed in SDN environment 100 to perform examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

We claim:

1. A method for a computer system to perform packet handling for active-active stateful service insertion, wherein the method comprises:
   in response to detecting a first packet from a first active logical service router (SR), wherein the first active logical SR and a second active logical SR are both associated with the service endpoint address and configured to operate in an active-active mode, generating and storing state information that associates (a) the first active logical SR and (b) first tuple information specified by the first packet; and sending the first packet towards a destination capable of processing the first packet and responding with a second packet; and in response to detecting the second packet from the destination responsive to the first packet, selecting the first active logical SR over the second active logical SR based on the state information and second tuple information specified by the second packet; and sending the second packet towards the first active logical SR for processing according to a stateful service.

2. The method of claim 1, wherein generating and storing the state information comprises:

generating and storing the state information that specifies a first virtual tunnel endpoint (VTEP) address associated with a first edge supporting the first active logical SR, wherein the first VTEP address is different from a second VTEP address associated with a second edge supporting the second active logical SR.

3. The method of claim 2, wherein forwarding the second packet towards the first active logical SR comprises:

generating an encapsulated packet by encapsulating the second packet with an outer header that is addressed to the first VTEP address; and sending the encapsulated packet towards the first edge supporting the first active logical SR.

4. The method of claim 1, wherein generating and storing the state information comprises:

identifying a service flag associated with the first packet, wherein the service flag is set by the first active logical SR to indicate stateful service connection and cause the state information to be generated and stored.

5. The method of claim 1, wherein generating and storing the state information comprises:

generating and storing the state information specifying the service endpoint address and at least one of the following first tuple information: a service protocol, a source address, a source port number, a destination address and a destination port number.

6. The method of claim 1, wherein selecting the first active logical SR comprises:

selecting, by a tier-1 logical distributed router (T1-DR) supported by the computer system, the first active logical SR in the form of a first tier-1 logical service router (T1-SR) supported by a first edge.

7. The method of claim 1, wherein selecting the first active logical SR comprises:

selecting, by a tier-0 logical distributed router (T0-DR) supported by the computer system, the first active logical SR in the form of a first tier-1 logical service router (T1-SR) supported by a first edge.

8. A non-transitory computer-readable storage medium that includes a set of instructions which, in response to execution by a processor of a computer system, cause the processor to perform a method of packet handling for active-active stateful service insertion, wherein the method comprises:

in response to detecting a first packet from a first active logical service router (SR), wherein the first active logical SR and a second active logical SR are both associated with the service endpoint address and configured to operate in an active-active mode, generating and storing state information that associates (a) the first active logical SR and (b) first tuple information specified by the first packet; and sending the first packet towards a destination capable of processing the first packet and responding with a second packet; and in response to detecting the second packet from the destination responsive to the first packet, selecting the first active logical SR over the second active logical SR based on the state information and second tuple information specified by the second packet; and sending the second packet towards the first active logical SR for processing according to a stateful service.

9. The non-transitory computer-readable storage medium of claim 8, wherein generating and storing the state information comprises:

generating and storing the state information that specifies a first virtual tunnel endpoint (VTEP) address associated with a first edge supporting the first active logical SR, wherein the first VTEP address is different from a second VTEP address associated with a second edge supporting the second active logical SR.

10. The non-transitory computer-readable storage medium of claim 9, wherein forwarding the second packet towards the first active logical SR comprises:

generating an encapsulated packet by encapsulating the second packet with an outer header that is addressed to the first VTEP address; and sending the encapsulated packet towards the first edge supporting the first active logical SR.

11. The non-transitory computer-readable storage medium of claim 8, wherein generating and storing the state information comprises:

identifying a service flag associated with the first packet, wherein the service flag is set by the first active logical SR to indicate stateful service connection and cause the state information to be generated and stored.

12. The non-transitory computer-readable storage medium of claim 8, wherein generating and storing the state information comprises:

generating and storing the state information specifying the service endpoint address and at least one of the following first tuple information: a service protocol, a source address, a source port number, a destination address and a destination port number.

13. The non-transitory computer-readable storage medium of claim 8, wherein selecting the first active logical SR comprises:

selecting, by a tier-1 logical distributed router (T1-DR) supported by the computer system, the first active logical SR in the form of a first tier-1 logical service router (T1-SR) supported by a first edge.

14. The non-transitory computer-readable storage medium of claim 8, wherein selecting the first active logical SR comprises:

selecting, by a tier-0 logical distributed router (T0-DR) supported by the computer system, the first active logical SR in the form of a first tier-1 logical service router (T1-SR) supported by a first edge.

15. A computer system, comprising:

a processor; and a non-transitory computer-readable medium having stored thereon instructions that, when executed by the processor, cause the processor to:

in response to detecting a first packet from a first active logical service router (SR), wherein the first active logical SR and a second active logical SR are both associated with the service endpoint address and configured to operate in an active-active mode,
  generate and store state information that associates (a) the first active logical SR and (b) first tuple information specified by the first packet; and
  send the first packet towards a destination capable of processing the first packet and responding with a second packet; and
in response to detecting the second packet from the destination responsive to the first packet,
  select the first active logical SR over the second active logical SR based on the state information and second tuple information specified by the second packet; and
  send the second packet towards the first active logical SR for processing according to a stateful service.

16. The computer system of claim 15, wherein the instructions for generating and storing the state information cause the processor to:
  generate and store the state information that specifies a first virtual tunnel endpoint (VTEP) address associated with a first edge supporting the first active logical SR, wherein the first VTEP address is different from a second VTEP address associated with a second edge supporting the second active logical SR.

17. The computer system of claim 16, wherein the instructions for forwarding the second packet towards the first active logical SR cause the processor to:
  generate an encapsulated packet by encapsulating the second packet with an outer header that is addressed to the first VTEP address; and
  send the encapsulated packet towards the first edge supporting the first active logical SR.

18. The computer system of claim 15, wherein the instructions for generating and storing the state information cause the processor to:
  identify a service flag associated with the first packet, wherein the service flag is set by the first active logical SR to indicate stateful service connection and cause the state information to be generated and stored.

19. The computer system of claim 15, wherein the instructions for generating and storing the state information cause the processor to:
  generate and store the state information specifying the service endpoint address and at least one of the following first tuple information: a service protocol, a source address, a source port number, a destination address and a destination port number.

20. The computer system of claim 15, wherein the instructions for selecting the first active logical SR cause the processor to:
  select, by a tier-1 logical distributed router (T1-DR) supported by the computer system, the first active logical SR in the form of a first tier-1 logical service router (T1-SR) supported by a first edge.

21. The computer system of claim 15, wherein the instructions for selecting the first active logical SR cause the processor to:
  select, by a tier-0 logical distributed router (T0-DR) supported by the computer system, the first active logical SR in the form of a first tier-1 logical service router (T1-SR) supported by a first edge.

* * * * *